(12) United States Patent
Uchida et al.

(10) Patent No.: US 11,340,503 B2
(45) Date of Patent: May 24, 2022

(54) DISPLAY DEVICE

(71) Applicant: Japan Display Inc., Minato-ku (JP)

(72) Inventors: Makoto Uchida, Tokyo (JP); Takanori Tsunashima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/874,028

(22) Filed: Jan. 18, 2018

(65) Prior Publication Data

US 2018/0210246 A1 Jul. 26, 2018

(30) Foreign Application Priority Data

Jan. 20, 2017 (JP) .............................. JP2017-008621

(51) Int. Cl.
| | | |
|---|---|---|
| G02F 1/1343 | (2006.01) | |
| G02F 1/1362 | (2006.01) | |
| G02F 1/1337 | (2006.01) | |

(52) U.S. Cl.
CPC .. *G02F 1/134363* (2013.01); *G02F 1/134309* (2013.01); *G02F 1/133707* (2013.01); *G02F 1/134372* (2021.01); *G02F 1/136213* (2013.01); *G02F 1/136227* (2013.01); *G02F 2201/121* (2013.01); *G02F 2201/122* (2013.01); *G02F 2201/123* (2013.01); *G02F 2201/128* (2013.01); *G09G 2300/0434* (2013.01); *G09G 2300/0876* (2013.01); *G09G 2320/028* (2013.01)

(58) Field of Classification Search
CPC ......... G02F 1/134363; G02F 1/134909; G02F 1/136213; G02F 1/133707; G02F 2001/134372; G02F 2201/121; G02F 2201/122; G02F 2201/123; G02F 2201/128; G09G 2300/0434; G09G 2300/0876; G09G 2320/028
See application file for complete search history.

(56) References Cited

U.S. PATENT DOCUMENTS

| | | | |
|---|---|---|---|
| 2003/0086045 A1 | 5/2003 | Ono et al. | |
| 2009/0059110 A1 | 3/2009 | Sasaki et al. | |
| 2012/0182511 A1* | 7/2012 | Hisada | G02F 1/134363 349/139 |

(Continued)

FOREIGN PATENT DOCUMENTS

JP     5235363     7/2013

OTHER PUBLICATIONS

Office Action dated Sep. 23, 2020, in Japanese Patent Application No. 2017-008621, filed Jan. 20, 2017, (English Machine Translation).

*Primary Examiner* — Angela K Davison
(74) *Attorney, Agent, or Firm* — Oblon, McClelland, Maier & Neustadt, L.L.P.

(57) ABSTRACT

According to one embodiment, a display device including a first substrate including a first electrode, a second electrode located above the first electrode and having potential different from the first electrode, and a third electrode located above the second electrode and electrically connected to the first electrode, a second substrate facing the first substrate, and a liquid crystal layer held between the first substrate and the second substrate, wherein at least one of the second electrode and the third electrode includes a first side, and a second side which faces the first side and is not parallel to the first side.

5 Claims, 8 Drawing Sheets

(56) References Cited

U.S. PATENT DOCUMENTS

| | | |
|---|---|---|
| 2012/0280240 A1 | 11/2012 | Sasaki et al. |
| 2013/0107151 A1* | 5/2013 | Sasaki ............... G02F 1/134363 349/38 |
| 2015/0055044 A1 | 2/2015 | Sasaki et al. |
| 2016/0116812 A1 | 4/2016 | Sasaki et al. |
| 2018/0081246 A1 | 3/2018 | Mimura |

* cited by examiner

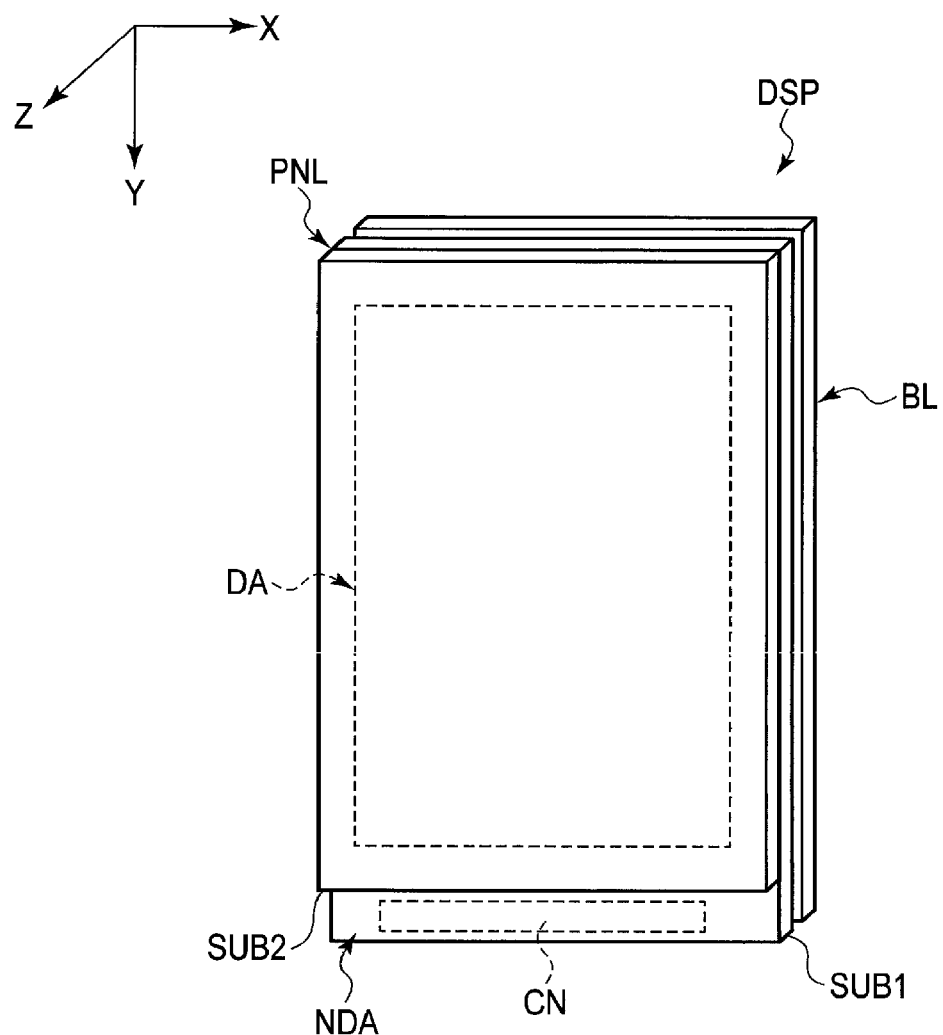
F I G. 1

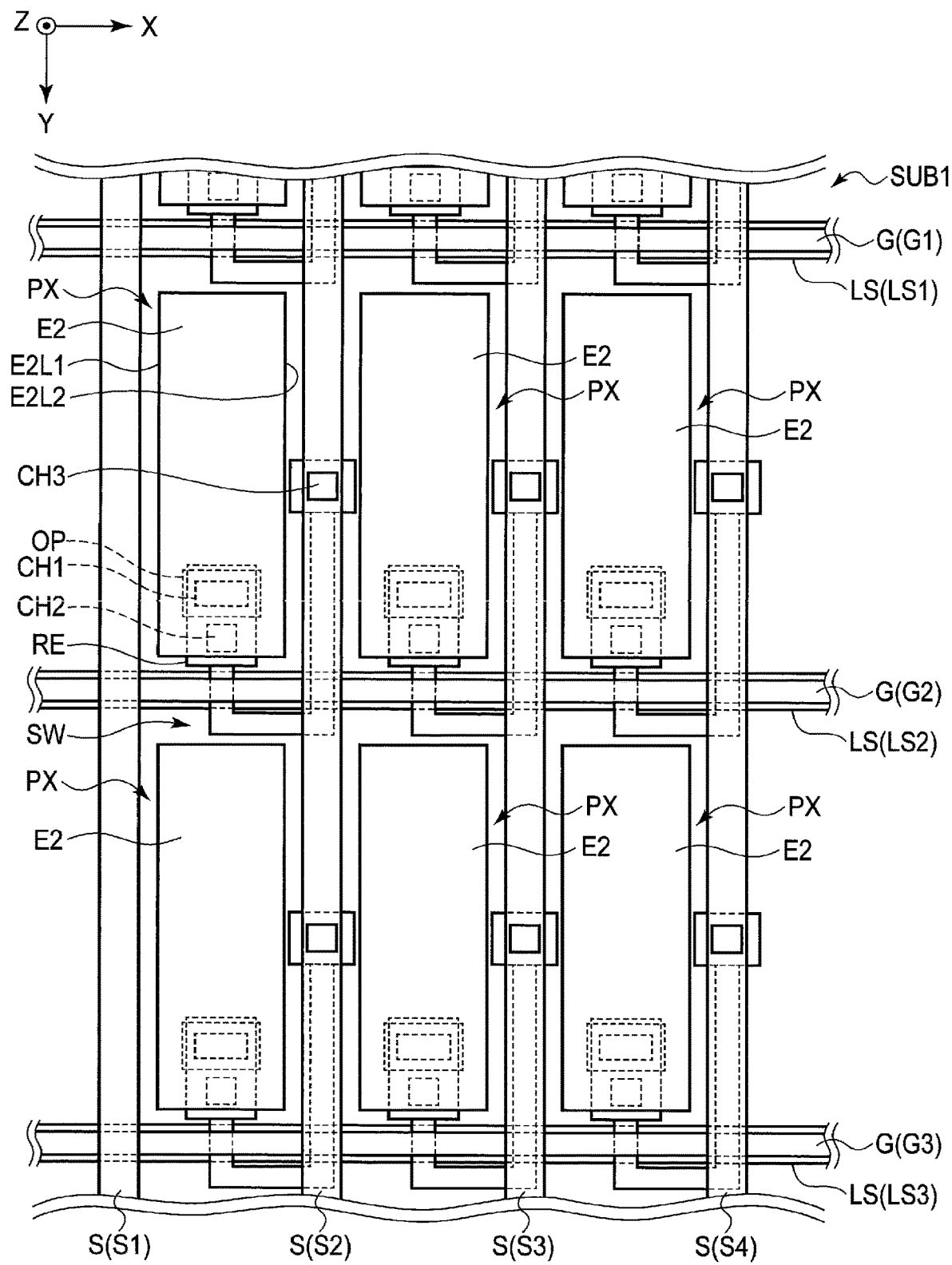
F I G. 2

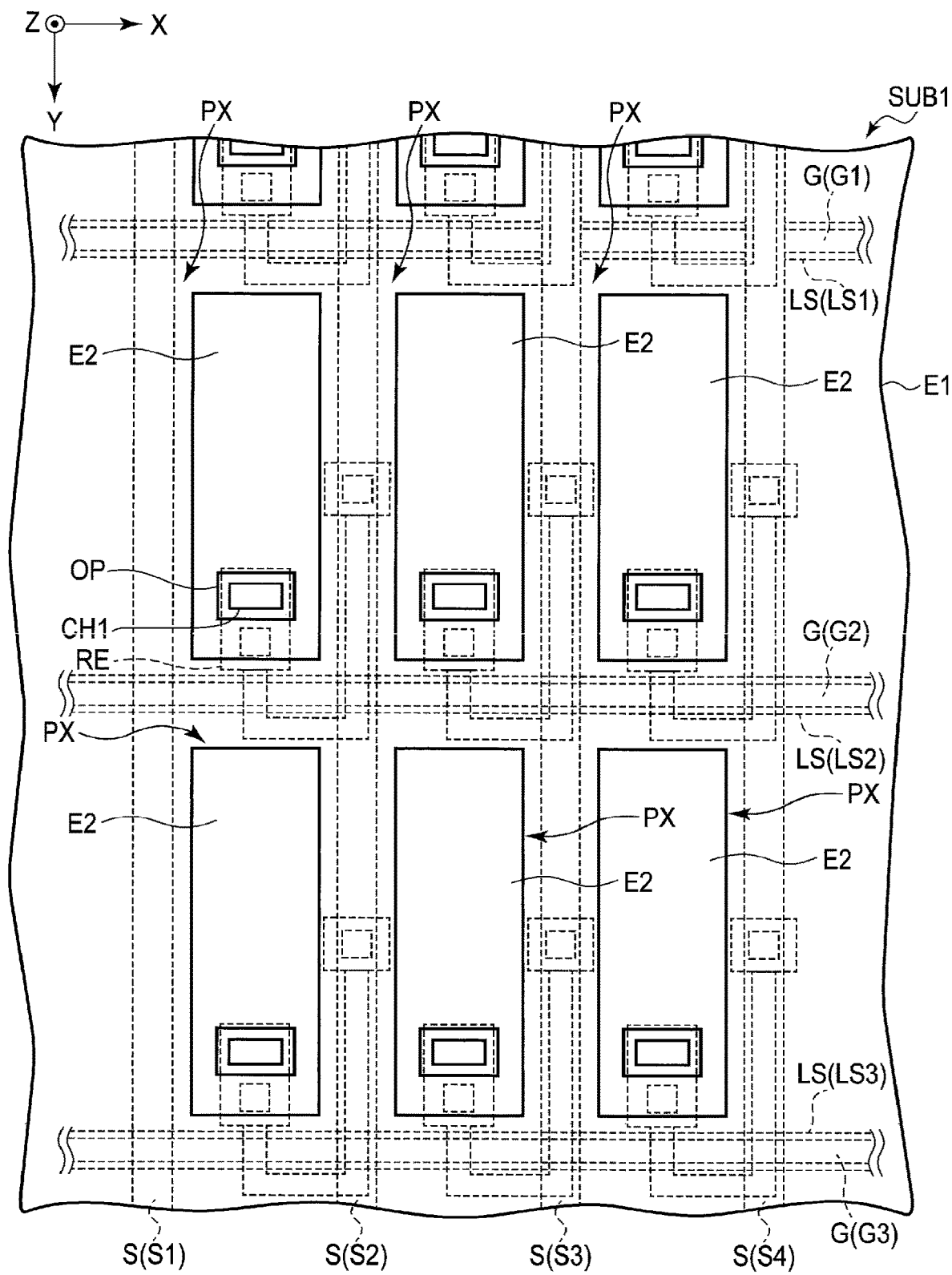
F I G. 3

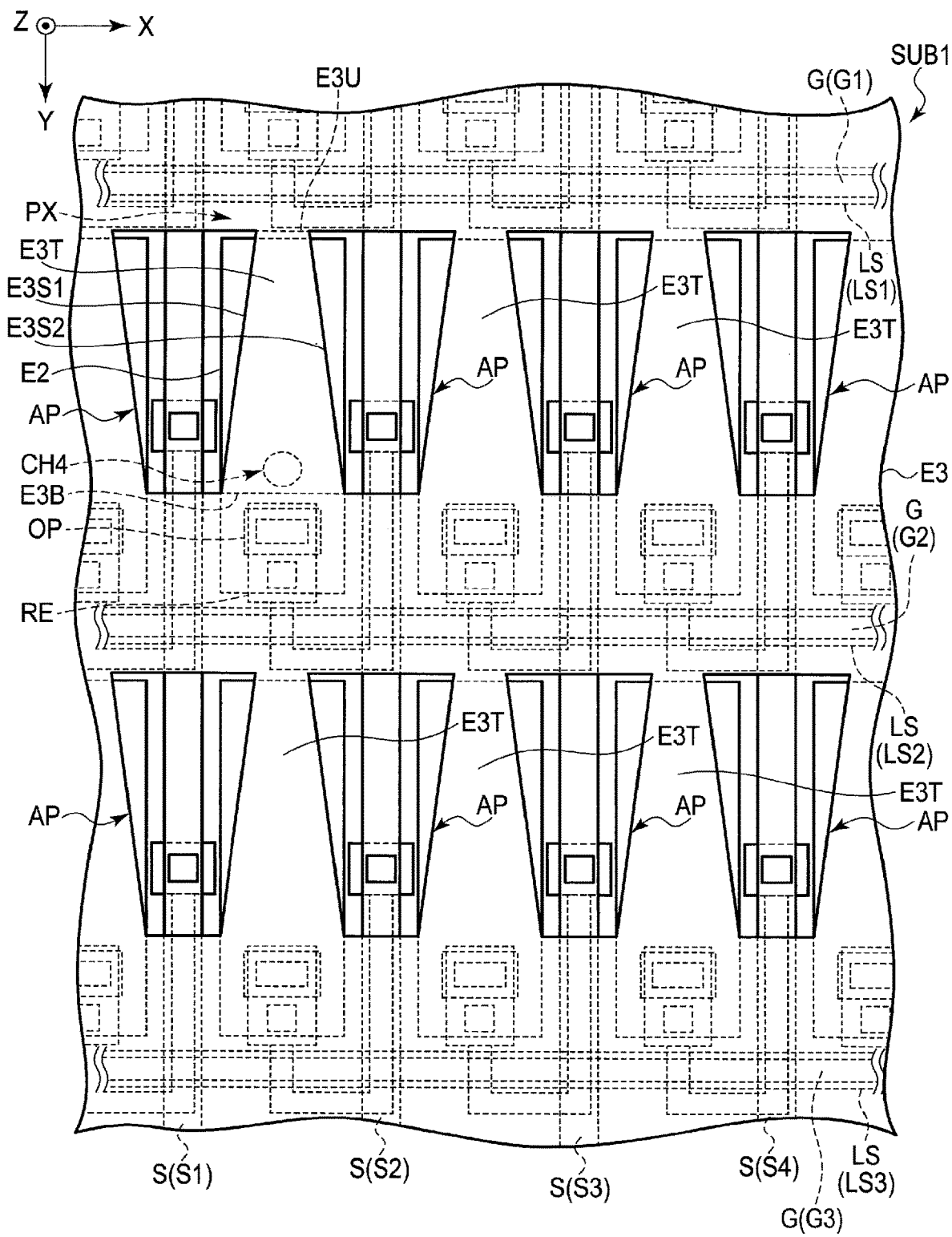
F I G. 8

DISPLAY DEVICE

CROSS-REFERENCE TO RELATED APPLICATIONS

This application is based upon and claims the benefit of priority from Japanese Patent Application No. 2017-008621, filed Jan. 20, 2017, the entire contents of which are incorporated herein by reference.

FIELD

Embodiments described herein relate generally to a display device.

BACKGROUND

Recently, the development of ultra-high-definition display devices has been expected along with the popularization of virtual reality (VR). However, in the conventional structure, when each pixel is small, it is difficult to ensure pixel capacitance (Cs capacitance). Moreover, since each pixel becomes small to obtain an ultra-high-definition display device, the realization of a wide viewing angle with a complicated pixel structure may be difficult.

BRIEF DESCRIPTION OF THE DRAWINGS

FIG. 1 is a cross-sectional view showing a structural example of a display device according to an embodiment.

FIG. 2 is a plan view of a first substrate.

FIG. 3 is a plan view showing a first electrode provided in the first substrate according to the embodiment.

FIG. 8 is a plan view showing the third electrode of the first substrate according to another structural example of the display device of the embodiment.

DETAILED DESCRIPTION

Figure 4:
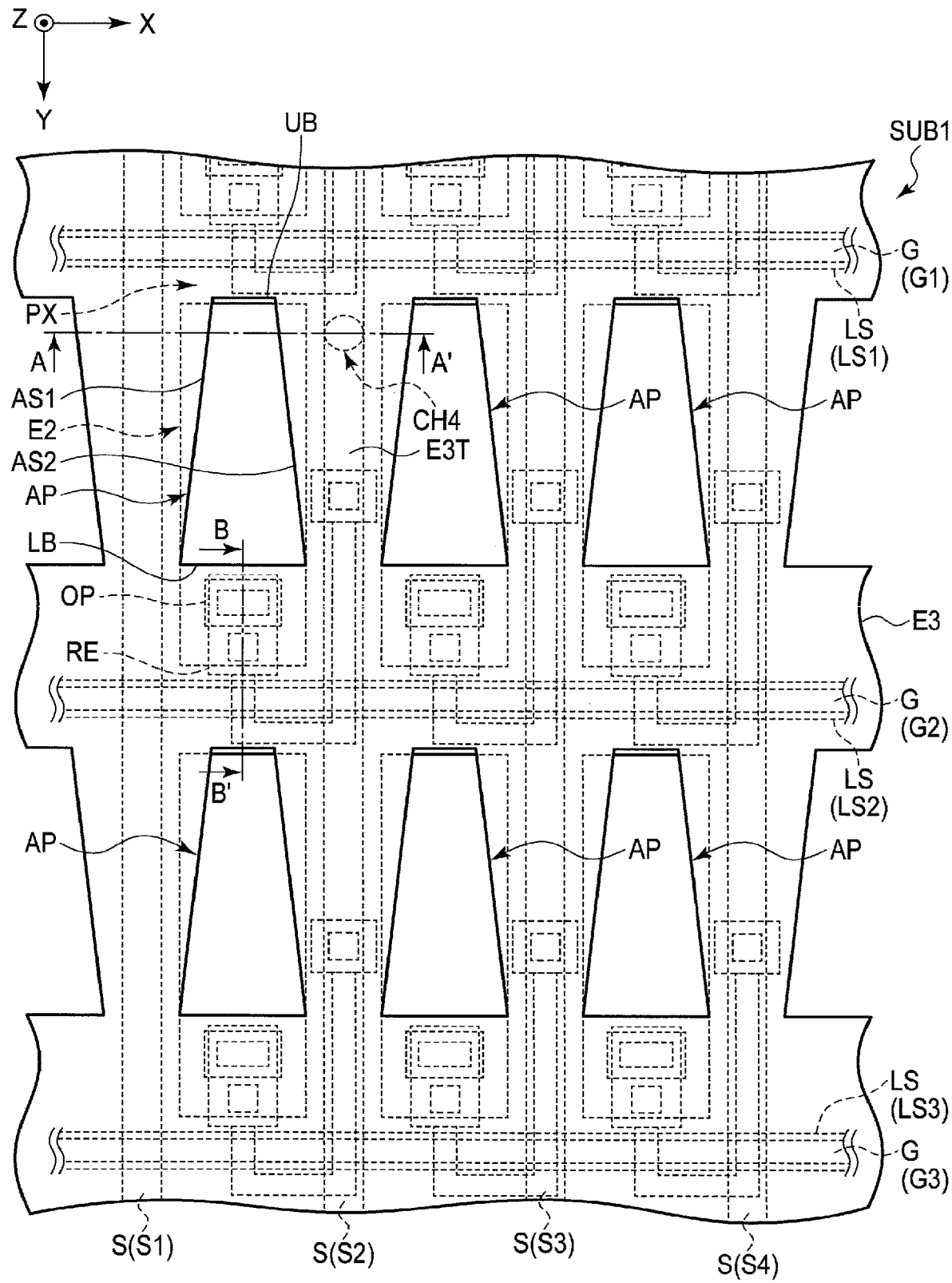
FIG. 4 is a plan view showing a third electrode provided in the first substrate according to the embodiment.

In general, according to one embodiment, a display device comprises: a first substrate comprising a first electrode, a second electrode located above the first electrode and having potential different from the first electrode, and a third electrode located above the second electrode and electrically connected to the first electrode; a second substrate facing the first substrate; and a liquid crystal layer held between the first substrate and the second substrate, wherein at least one of the second electrode and the third electrode comprises a first side, and a second side which faces the first side and is not parallel to the first side.

According to another embodiment, a display device comprises: a first substrate comprising a source line, a first common electrode located above the source line, a first pixel electrode and a second pixel electrode above the first common electrode, and a second common electrode located above the first pixel electrode and the second pixel electrode; a second substrate facing the first substrate; and a liquid crystal layer held between the first substrate and the second substrate, wherein as seen in plan view, the source line is located between the first pixel electrode and the second pixel electrode, and the second common electrode comprises a first side overlapping the first pixel electrode and a second side overlapping the second pixel electrode, and the first side faces the second side across the intervening source line, and neither the first side nor the second side is parallel to an extension direction of the source line.

According to yet another embodiment, a display device comprises: a first substrate comprising a source line, a first common electrode located above the source line, and a first pixel electrode and a second pixel electrode above the first common electrode; a second substrate facing the first substrate; and a liquid crystal layer held between the first substrate and the second substrate, wherein as seen in plan view, the source line is located between the first pixel electrode and the second pixel electrode, and the first pixel electrode comprises a first side overlapping the first common electrode, the second pixel electrode comprises a second side overlapping the first common electrode, and the first side faces the second side across the intervening source line, and neither the first side nor the second side is parallel to an extension direction of the source line.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In each embodiment, a display device is disclosed as an example of an electronic device. The display device may be used for various devices such as a virtual reality (VR) viewer, a smartphone, a tablet, a mobile phone, a notebook computer and a game console.

FIG. 1 is a perspective view showing an example of the external appearance of a liquid crystal display device DSP. A first direction X, a second direction Y and a third direction Z are perpendicular to one another. However, they may intersect one another at an angle other than 90 degrees. The first direction X and the second direction Y are equivalent to directions parallel to the main surfaces of the substrates of the liquid crystal display device (hereinafter, simply referred to as the display device) DSP. The third direction Z is equivalent to the thickness direction of the display device DSP. FIG. 1 is a plan view of the display device DSP in the X-Y plane defined by the first direction X and the second direction Y. In the following explanation, a plan view is defined as appearance when the X-Y plane is viewed in the third direction Z.

The display device DSP comprises a display panel PNL and an illumination device BL.

The display panel PNL comprises a first substrate SUB1, a second substrate SUB2, and a liquid crystal layer (the liquid crystal layer LC described later) held between the first substrate SUB1 and the second substrate SUB2. The display panel PNL comprises a display area DA and a non-display area NDA. The display area DA is an area for displaying an image. The display area DA is located substantially in the center of the area where the first substrate SUB1 faces the second substrate SUB2. The non-display area NDA is an area in which an image is not displayed. The non-display area NDA is located outside the display area DA.

The first substrate SUB1 comprises a connection unit CN. The connection unit CN comprises terminals for connecting signal supply sources such as a flexible printed circuit and an IC chip. The connection unit CN is located in the non-display area NDA.

The illumination device BL is provided on the rear side of the first substrate SUB1 (in other words, on a side opposite to the surface facing the second substrate SUB2). Various forms are applicable to the illumination device BL. For example, the illumination device BL comprises a lightguide plate facing the first substrate SUB1, light sources provided along the edge portion of the lightguide plate, such as a plurality of light-emitting diodes (LEDs), a reflective sheet provided on one of the main surfaces of the lightguide plate, and various optical sheets stacked on the other main surface of the lightguide plate.

The display panel PNL of the example shown in FIG. 1 is a transmissive display panel which displays an image by selectively transmitting light from the illumination device BL. However, the display panel PNL is not limited to this example. For example, the display panel PNL may be either a reflective display panel which displays an image by selectively reflecting external light or light from an external light source or a transflective display panel comprising both the transmissive display function and the reflective display function.

Although the explanation of the detailed structure of the display panel PNL is omitted here, any one of a display mode using a longitudinal electric field along the normal line of the display panel PNL, a display mode using an inclined electric field angled with respect to the normal line of the display panel PNL and a display mode using a lateral electric field along the main surfaces of the display panel PNL may be applied.

In each embodiment, the direction from the first substrate SUB1 to the second substrate SUB2 is defined as "upward" (or toward the upper side). The direction from the second substrate SUB2 to the first substrate SUB1 is defined as "downward" (or toward the lower side).

FIG. 2 is a plan view schematically showing the first substrate SUB1. FIG. 2 shows the main part of the first substrate SUB1. Here, this specification explains a structural example to which a fringe field switching (FFS) mode, which is one of the display modes using a lateral electric field, is applied.

The first substrate SUB1 comprises a plurality of gate lines G (G1, G2, G3, . . . ), a plurality of light-shielding layers LS (LS1, LS2, LS3, . . . ), a plurality of source lines S (S1, S2, S3, S4, . . . ), switching elements SW, relay electrodes RE, a first electrode E1, second electrodes E2, a third electrode E3, etc. FIG. 2 shows only the structures necessary for explanation. For example, the first electrode E1 and the third electrode E3 are omitted in FIG. 2.

The gate electrodes G (G1, G2, G3, . . . ) are arranged at regular intervals in the second direction Y. The gate lines G (G1, G2, G3, . . . ) extend in the first direction X and are linear. The gate lines G (G1, G2, G3, . . . ) may be partially bent. The gate lines G (G1, G2, G3, . . . ) are, for example, a film formed of molybdenum tungsten alloy. As seen in plan view, the gate lines G overlap the light-shielding layers LS.

The light-shielding layers LS (LS1, LS2, LS3, . . . ) are arranged at regular intervals in the second direction Y. The light-shielding layers LS (LS1, LS2, LS3, . . . ) extend in the first direction X along the gate lines G (G1, G2, G3, . . . ) and are linear. The light-shielding layers LS (LS1, LS2, LS3, . . . ) may be partially bent. The light-shielding layers LS are formed of, for example, molybdenum tungsten alloy. In the example of FIG. 2, the width of each light-shielding layer LS in the second direction Y is greater than the width of each gate line G in the second direction Y.

The source lines S (S1, S2, S3, S4, . . . ) are arranged at regular intervals in the first direction X. The source lines S (S1, S2, S3, S4, . . . ) extend in the second direction Y. The source lines S (S1, S2, S3, S4, . . . ) may be partially bent. The source lines S (S1, S2, S3, S4, . . . ) are a three-layer film of titanium, aluminum and titanium, a three-layer film formed by stacking aluminum, titanium and aluminum in this order, etc. In FIG. 2, each pixel PX is equivalent to the area defined by two adjacent gate lines and two adjacent source lines. For example, a pixel PX is equivalent to the area defined by the gate lines G1 and G2 and the source lines S1 and S2.

Each switching element SW is electrically connected to a corresponding gate line G and a corresponding source line S. The detail of each switching element SW is explained in detail later. Each relay electrode RE is electrically connected to a corresponding switching element SW. Each relay electrode RE is, for example, a three-layer film formed by stacking titanium, aluminum and titanium in this order, or a three-layer film formed by stacking aluminum, titanium and aluminum in this order. Each second electrode E2 is a pixel electrode provided in a corresponding pixel PX. Each second electrode E2 is electrically connected to a corresponding relay electrode RE. Potential corresponding to an image signal is applied to each second electrode E2. In the example of FIG. 2, each second electrode E2 has a rectangular plate shape which does not comprise a slit, etc., and extends substantially parallel to the source lines S. Each second electrode E2 comprises two sides E2L1 and E2L2 facing each other in the first direction and parallel to each other. In the example of FIG. 2, the sides E2L1 and E2L2 extend in the second direction Y. In the above example, each second electrode E2 has a rectangular plate shape which does not comprise a slit, etc. However, each second electrode E2 may have a shape comprising a slit, etc., or may have other shapes. FIG. 2 shows a contact hole CH1 which is located inside an aperture portion OP formed in the first electrode E1 and is used to electrically connect the relay electrode RE and the second electrode E2. FIG. 2 shows a contact hole CH2 used to electrically connect the relay electrode RE and the switching element SW. FIG. 2 shows a contact hole CH3 used to electrically connect the switching element SW and the source line S.

FIG. 3 is a plan view schematically showing the first electrode E1 of the first substrate SUB1 according to the present embodiment. Here, the main part of the first substrate SUB1 shown in FIG. 2 is indicated with dashed lines.

The first electrode E1 is formed over a plurality of pixels PX. In the example of FIG. 3, the first electrode E1 extends in the first direction X and the second direction Y in the X-Y plane. As seen in plan view, the first electrode E1 overlaps the source lines S, the gate lines G, the light-shielding layers LS, the second electrodes E2, etc. The first electrode E1 comprises the aperture portions OP for electrically connecting the second electrodes E2 and the switching elements SW via the relay electrodes RE. The first electrode E1 is a first common electrode to which common potential is applied.

FIG. 4 is a plan view showing the third electrode E3 of the first substrate SUB1 according to the present embodiment. Here, the main part of the first substrate SUB1 shown in FIG. 2 is indicated with dashed lines.

The first substrate SUB1 comprises the third electrode E3, etc. The third electrode E3 has a lattice shape in the X-Y plane. The third electrode E3 comprises a plurality of aperture portions AP. The aperture portions AP extend in the second direction Y along the source lines S. Each aperture portion AP comprises two sides AS1 and AS2 which face each other in the first direction X and are not parallel to each other. In the example of FIG. 4, both the side AS1 and the side AS2 extend in a direction intersecting the second direction Y. For example, the angle between the extension direction of the side AS1 and the second direction Y is equal to the angle between the extension direction of the side AS2 and the second direction Y. In the example of FIG. 4, the sides AS1 and AS2 overlap the second electrodes E2. The two sides AS1 and AS2 are linear. However, they may be curved. In the example of FIG. 4, each aperture portion AP has a trapezoidal shape comprising an upper base UB and a lower base LB. Each aperture portion AP may be triangular such that the length of the upper base UB in the first direction X is zero. The aperture portions AP extend in the second direction Y along the source lines S. For example, as seen in plan view, the aperture portions AP overlap the second electrodes E2. However, the aperture portions AP do not overlap the aperture portions OP or the relay electrodes RE. As seen in plan view, the aperture portions AP may overlap the entire width of each second electrode E2 in the second direction Y. For example, as seen in plan view, the third electrode E3 overlaps the source lines S in the portion (a first portion E3T) between two adjacent aperture portions AP in the first direction X. For example, as seen in plan view, the third electrode E3 overlaps the aperture portions OP, the relay electrodes RE and the gate lines G in the portion between two adjacent aperture portions AP in the second direction Y. The third electrode E3 is a second common electrode provided over a plurality of pixels PX. FIG. 4 shows a contact hole CH4 for electrically connecting the first electrode E1 and the third electrode E3.

Figure 5:
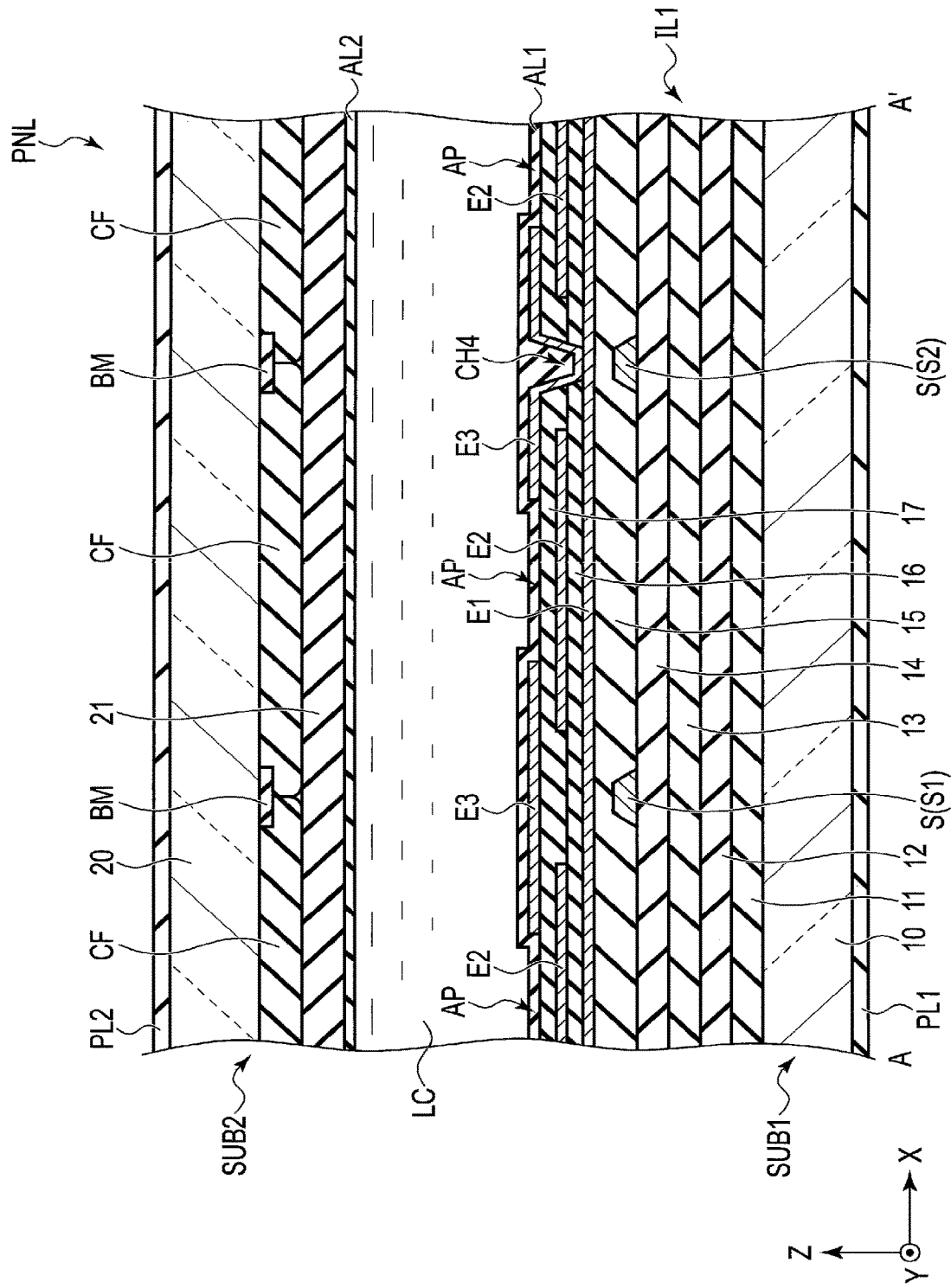
FIG. 5 is a cross-sectional view of a display panel along line A-A' of FIG. 4.

FIG. 5 is a cross-sectional view of the display panel PNL along line A-A' of FIG. 4.

The first substrate SUB1 comprises a supporting substrate 10, insulating films 11, 12, 13, 14, 15, 16 and 17, the source lines S (S1 and S2), the first electrode E1, the second electrodes E2, the third electrodes E3, an alignment film AL1, etc. A polarizer PL1 is provided under the supporting substrate 10. The insulating films 11 to 17 may be referred to as interlayer insulating films.

The supporting substrate 10 is transparent. For example, the supporting substrate 10 is a glass substrate formed of borosilicate glass. However, the supporting substrate 10 may be formed of resin such as plastic.

All of the insulating films 11 to 17 are transparent. The insulating films 11 to 14, 16 and 17 are inorganic insulating films, and are formed of, for example, silicon nitride or silicon oxide. The insulating film 15 is an organic insulating film, and is formed of, for example, resin such as acrylic resin. The insulating film 11 is located on the supporting substrate 10, and is in contact with the supporting substrate 10. The insulating film 12 is located on the insulating film 11, and is in contact with the insulating film 11. The insulating film 13 is located on the insulating film 12, and is in contact with the insulating film 12. The insulating film 14 is located on the insulating film 13, and is in contact with the insulating film 13. The source lines S1 and S2 are located on the insulating film 14, and are in contact with the insulating film 14. The source lines S1 and S2 are spaced apart from each other at a predetermined interval in the first direction X. The insulating film 15 is located on the insulating film 14 and the source lines S1 and S2, and is in contact with the insulating film 14 and the source lines S1 and S2. The insulating films 11 to 14 may be collectively called an insulating film (a first insulating film) IL1.

The first electrode E1 is located on the insulating film 15, and is in contact with the insulating film 15. The first electrode E1 extends across a plurality of second electrodes E2. For example, the first electrode E1 is formed of a transparent conductive material such as indium tin oxide (ITO), indium zinc oxide (IZO) or indium gallium oxide (IGO). The first electrode E1 should be transparent in the portion overlapping the area which contributes to display. The other portions may be formed of a material which is not transparent. The insulating film 16 is located on the first electrode E1, and is in contact with the first electrode E1.

Each second electrode E2 is located on the insulating film 16. In the example of FIG. 5, two adjacent second electrodes E2 are spaced apart from each other at a predetermined interval in the first direction X. The second electrodes E2 are not located above the source line S1 or S2. For example, the second electrodes E2 are pixel electrodes. The second electrodes E2 have potential different from that of the first electrode E1. The second electrodes E2 are formed of a transparent conductive material similar to that of the first electrode E1. The second electrodes E2 should be transparent in the portion overlapping the area which contributes to display. The other portions may be formed of a material which is not transparent.

The insulating film 17 is located on the insulating film 16 and the second electrodes E2, and is in contact with the insulating film 16 and the second electrodes E2.

The third electrodes E3 are located on the insulating film 17, and are in contact with the insulating film 17. In the example of FIG. 5, the aperture portions AP face the second electrodes E2 via the insulating film 17. The third electrodes E3 are in contact with the first electrode E1 via the contact hole CH4 described above. The contact hole CH4 penetrates the insulating films 16 and 17 and reaches the first electrode E1. In the example of FIG. 5, the contact hole CH4 is located immediately above the source line S2. The contact hole CH4 may be formed at a different position. The third electrodes E3 are formed of a transparent conductive material similar to that of the first electrode E1. The third electrodes E3 should be transparent in the portion overlapping the area which contributes to display. The other portions may be formed of a material which is not transparent.

The alignment film AL1 covers the insulating film 17 and the third electrodes E3. The alignment film AL1 is formed of, for example, polyimide.

The liquid crystal layer LC is located on the first substrate SUB1. The liquid crystal layer LC may be a positive liquid crystal layer having positive dielectric anisotropy, or may be a negative liquid crystal layer having negative dielectric anisotropy.

The second substrate SUB2 is located on the liquid crystal layer LC. The second substrate SUB2 comprises a supporting substrate 20, a light-shielding layer BM, a color filter CF, an insulating film 21, an alignment film AL2, etc.

A polarizer PL2 is provided on the supporting substrate 20. The absorption axis of the polarizer PL1 and the absorption axis of the polarizer PL2 are set such that they are perpendicular to each other as seen in plan view.

The supporting substrate 20 is transparent. For example, the supporting substrate 20 is formed of glass such as borosilicate glass. However, the supporting substrate 20 may be formed of resin such as plastic. The light-shielding layer BM is located under the supporting substrate 20, and is in contact with the supporting substrate 20. The light-shielding layer BM is located immediately above the source lines S1 and S2. The color filter CF is located under the supporting substrate 20 and the light-shielding layer BM, and is in contact with the supporting substrate 20 and the light-shielding layer BM. In the example of FIG. 5, the color filter CF faces the second electrodes E2, and is partially in contact with the light-shielding layer BM. The color filter CF includes a red color filter, a green color filter, a blue color filter, etc. The insulating film 21 is located under the color filter CF, and is in contact with the color filter CF. The color filter CF may be provided in the first substrate SUB1. The color filter CF may include color filters corresponding to four or more colors. In a pixel corresponding to white, a white color filter may be provided. Alternatively, an uncolored resinous material may be provided. Alternatively, an overcoat layer OC may be provided without providing any color filter.

The insulating film 21 is a transparent organic insulating film, and is formed of, for example, resin such as acrylic resin. The alignment film AL2 is located under the insulating film 21, is in contact with the insulating film 21, and covers the insulating film 21. The alignment film AL2 is an optical alignment film formed of polyimide.

Figure 6:
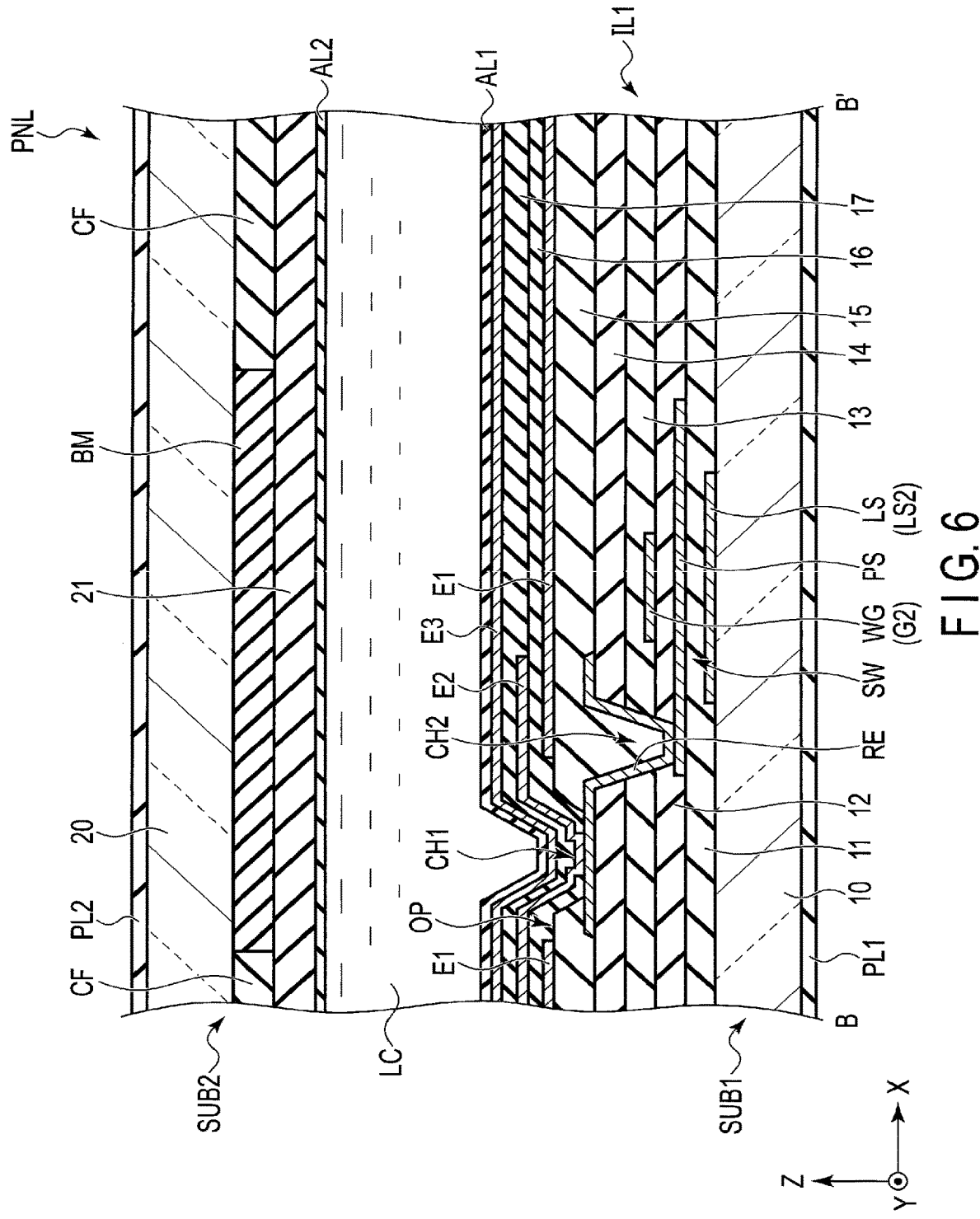
FIG. 6 is a cross-sectional view of the display panel along line B-B' of FIG. 4.

FIG. 6 is a cross-sectional view of the display panel PNL along line B-B' of FIG. 4. Here, portions different from those of the cross-sectional view shown in FIG. 5 are mainly explained.

The first substrate SUB1 comprises the light-shielding layer LS2, the switching element SW, the relay electrode RE, etc. The light-shielding layer LS2 is located between the supporting substrate 10 and the insulating film 11, and is in contact with the supporting substrate 10. The light-shielding layer LS2 is formed of, for example, molybdenum tungsten alloy. The switching element SW comprises a semiconductor layer PS. The semiconductor layer PS is located between the insulating film 11 and the insulating film 12, and is in contact with the insulating film 11. For example, the semiconductor layer PS is formed of polycrystalline silicon. A gate electrode WG which is a part of the gate line G (G2) is located between the insulating film 12 and the insulating film 13, and is in contact with the insulating film 13. The relay electrode RE is located between the insulating film 14 and the insulating film 15, and is in contact with the insulating film 14. The relay electrode RE penetrates the insulating films 12 to 14, and is in contact with the upper surface of the semiconductor layer PS. The second electrode E2 extends in the contact hole CH1 via the aperture portion OP, and is in contact with the relay electrode RE. The contact hole CH1 penetrates the insulating film 15 and reaches the relay electrode RE. For example, the semiconductor layer PS may be an oxide semiconductor. The gate electrode WG is, for example, electrically connected to the light-shielding layer LS2. The gate electrode WG and the light-shielding layer LS2 preferably have the same potential.

The second substrate SUB2 comprises the light-shielding layer BM, etc. The light-shielding layer BM is located above the gate electrode WG and the contact hole CH1 between the supporting substrate 20 and the insulating film 21.

In the present embodiment, the display device DSP comprises the first electrode E1, the second electrode E2 located above the first electrode E1, and the third electrode E3 located above the second electrode E2 and comprising the aperture portion AP. The first electrode E1 is electrically connected to the third electrode E3. The potential of the second electrode E2 is different from that of the first electrode E1 and the third electrode E3. Substantially the entire second electrode E2 faces the first electrode E1 via the insulating film 16. The second electrode partially faces the third electrode E3 via the insulating film 17. In the display device DSP, pixel capacitance between the first electrode E1 and the second electrode E2 and pixel capacitance between the second electrode E2 and the third electrode E3 are formed in each pixel. Thus, the display device DSP can increase the pixel capacitance in comparison with a case where the first electrode is not provided. In this way, it is possible to prevent the degradation of the display quality caused by the shortage of pixel capacitance.

As seen in plan view, each aperture portion AP comprising the sides AS1 and AS2 which are not parallel to each other overlaps a corresponding second electrode E2. The direction of the fringe electric field formed between each second electrode E2 and the third electrode E3 differs between the area along the side AS1 and the area along the side AS2. Thus, a plurality of domains (in other words, areas in which liquid crystal molecules are aligned in a uniform direction) can be formed within a pixel. In this manner, the viewing angle can be optically ensured in a plurality of directions. Thus, the viewing angle can be broadened.

In the above structural example, the first electrode E1 and the third electrode E3 are common electrodes, and the second electrodes E2 are pixel electrodes. However, the present embodiment is not limited to this example. The first electrode E1 and the third electrode E3 may be pixel electrodes, and each second electrode E2 may be a common electrode.

Figure 7:
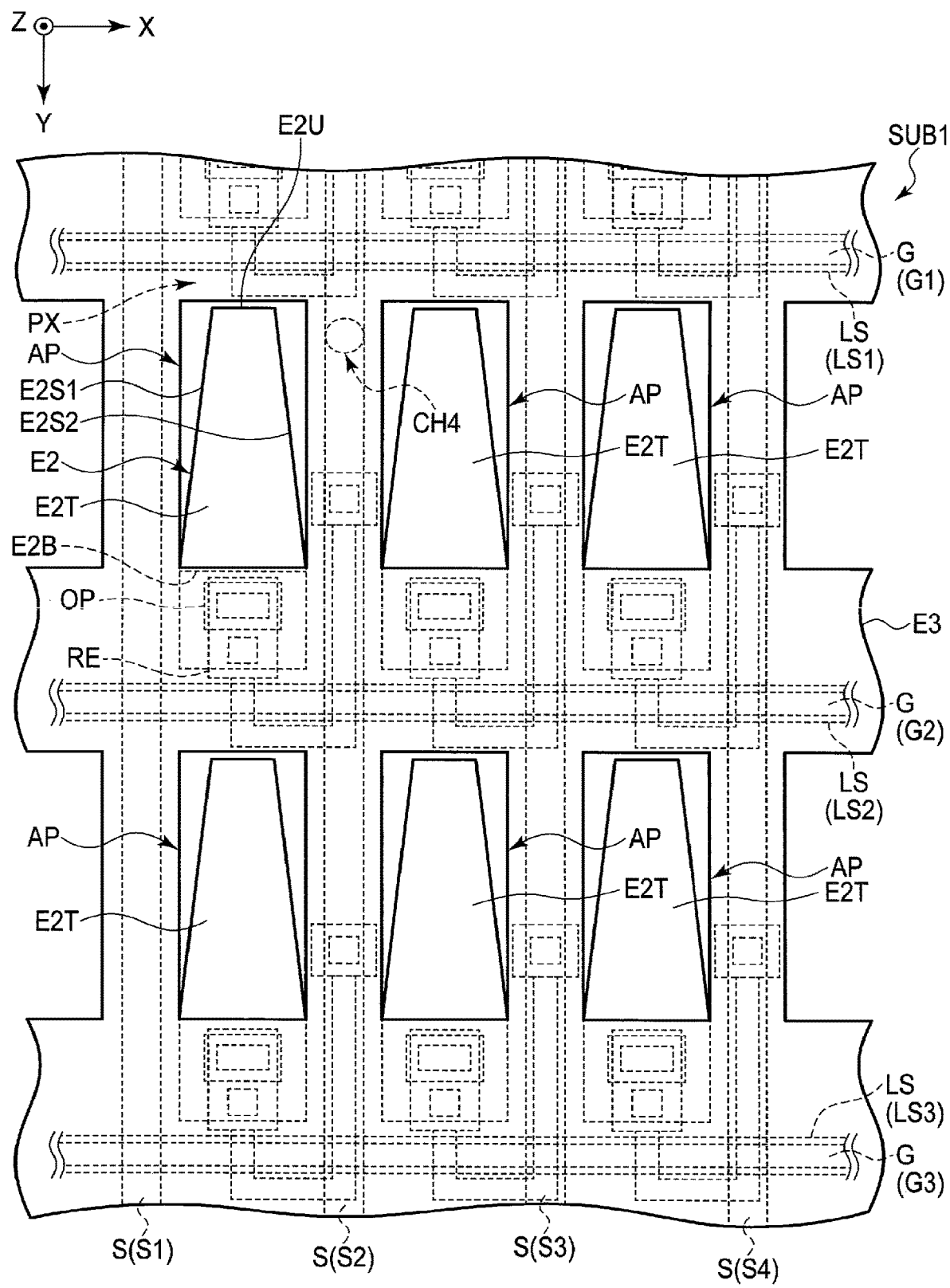
FIG. 7 is a plan view showing the third electrode of the first substrate according to another structural example of the display device of the embodiment.

Now, this specification explains other structural examples of the present embodiment with reference to FIG. 7 and FIG. 8. In the structural examples of the present embodiment explained below, the same portions as the above embodiment are denoted by like reference numbers, detailed description thereof being omitted. Portions different from those of the above embodiment are mainly explained in detail below. Effects similar to those of the above embodiment may be obtained from the other embodiments.

The structural example shown in FIG. 7 is different from that of FIG. 4 in respect that each second electrode E2 comprises a first portion E2T comprising two sides E2S1 and E2S2 which face each other in the first direction X and are not parallel to each other. In the example of FIG. 7, the two sides E2S1 and E2S2 are part of the sides E2L1 and E2L2, respectively. Both the side E2S1 and the side E2S2 extend in a direction intersecting the second direction Y. For example, the angle between the extension direction of the side E2S1 and the second direction Y is equal to the angle between the extension direction of the side E2S2 and second direction Y. In the example of FIG. 7, the sides E2S1 and E2S2 overlap the aperture portions AP as seen in plan view. The two sides E2S1 and E2S2 are linear. However, they may be curved. In the example of FIG. 7, each first portion E2T has a trapezoidal shape comprising an upper base E2U and a lower base E2B. Each first portion E2T may be triangular such that the length of the upper base E2U in the first direction X is zero. The first portions E2T extend in the second direction Y along the source lines S. Each aperture portion AP is rectangular, and extends substantially parallel to the source lines S. For example, each aperture portion AP is rectangular. However, each aperture portion AP may have a different shape. For example, as seen in plan view, the aperture portions AP overlap the first portions E2T, and do not overlap the aperture portions OP or the relay electrodes RE. In this structural example, effects similar to the above description can be obtained. In FIG. 7, the display device DSP may comprise a two-layer structure at least including the first electrode E1 and the second electrode E2 as long as pixel capacitance (Cs capacitance) is sufficiently ensured. The third electrode E3 is unnecessary.

The structural example shown in FIG. 8 is different from that of FIG. 4 in respect that the third electrode E3 comprises first portions E3T each comprising two sides E3S1 and E3S2 which face each other in the first direction X, overlap the second electrode E2 and are not parallel to each other as seen in plan view. Each first portion E3T is formed between two adjacent aperture portions AP. For example, a first portion E3T is located between the aperture portion AP overlapping the source line S1 and located between the gate line G1 and the gate line G2 and the aperture portion AP overlapping the source line S2 and located between the gate line G1 and the gate line G2. In the example of FIG. 8, both the side E3S1 and the side E3S2 extend in a direction intersecting the second direction Y. The first portions E3T overlap the second electrodes E2. However, the first portions E3T do not overlap the source lines S. For example, the angle between the extension direction of the side E3S1 and the second direction Y is equal to the angle between the extension direction of the side E3S2 and the second direction Y. In the example of FIG. 8, as seen in plan view, the sides E3S1 and E3S2 overlap the second electrodes E2. The two sides E3S1 and E3S2 are linear. However, they may be curved. In the example of FIG. 8, each first portion E3T has a trapezoidal shape comprising an upper base E3U and a lower base E3B. Each first portion E3T may be triangular such that the length of the upper base E3U in the first direction X is zero. The first portions E3T extend in the second direction Y along the source lines S. For example, as seen in plan view, the first portions E3T overlap the second electrodes E2 having a rectangular plate shape. However, the first portions E3T do not overlap the aperture portions OP or the relay electrodes RE. As seen in plan view, the first portions E3T may overlap the entire width of each second electrode E2 in the second direction Y. For example, as seen in plan view, the aperture portions AP overlap the source lines S. In the example of FIG. 8, the contact hole CH4 is located on the lower base E3B side of the first portion E3T in the second direction Y. The contact hole CH4 may be formed at a different position. In this structural example, effects similar to the above description can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first substrate;
    a second substrate facing the first substrate; and
    a liquid crystal layer held between the first substrate and the second substrate, wherein
    the first substrate comprises:
        a switching element;
        a source line electrically connected to one of electrodes of the switching element;
        a first electrode above the switching element and the source line;
        a second electrode located above the first electrode, and electrically connected to another one of electrodes of the switching element via a contact hole; and
        a third electrode located above the second electrode, and electrically connected to the first electrode,
    the third electrode comprises a first through hole comprising a first side, and a second side which faces the first side and is not parallel to the first side,
    the first through hole penetrates the third electrode, exposes an insulating film located between the second electrode and the third electrode, and overlaps with the source line in a plan view, and
    the third electrode entirely covers the contact hole.

2. The display device of claim 1, wherein the first through hole has a trapezoidal shape in the plan view.

3. The display device of claim 1, further comprising:
    a first interlayer insulating film located between the first electrode and the second electrode; and
    a second interlayer insulating film located between the second electrode and the third electrode and partially being in contact with the first interlayer insulating film, wherein
    the first electrode is connected to the third electrode via a contact hole penetrating the first interlayer insulating film and the second interlayer insulating film.

4. The display device of claim 1, wherein
    the first substrate comprises an insulating substrate, and a gate line,
    the first electrode overlaps the gate line, the source line, and the second electrode as seen in the plan view and comprises a second through hole, and
    the second electrode is electrically connected to the switching element via the second through hole.

5. The display device of claim 1, wherein the first electrode, the second electrode, and the third electrode are formed of a transparent conductive material.

* * * * *